Patented June 6, 1939

2,160,930

UNITED STATES PATENT OFFICE 2,160,930

PROCESS FOR SEPARATING WAX FROM PETROLATUM

James M. Whiteley, Roselle, and Hans G. Vesterdal, Elizabeth, N. J., assignors to Standard Oil Development Company, a corporation of Delaware Application March 23, 1935, Serial No. 12,730

11 Claims. (Cl. 196—17)

This invention relates to the separation of wax from petrolatum and other mixtures containing the same.

The usual method of separating wax from petrolatum consists in subjecting the mixture to a cracking distillation wherein the petrolatum wax is destroyed in order to obtain the paraffin wax in a crystallizable and filterable state. It will be seen that this method results in the partial destruction of the petrolatum. The present invention provides a method for separating wax from petrolatum by means of which a wax of high melting point may be recovered.

The term "wax" or "paraffin" as used here and in the appended claims will be understood to mean a hydrocarbon wax, substantially colorless, having a melting point below about 150° F., usually about 120 to 140° F., but not lower than 80° F., and characterized by a pronounced tendency to crystallize, forming large, well-defined crystals in mineral oil solutions, and having very little plastic properties. The term "petrolatum wax," on the other hand, will be understood to mean a hydrocarbon wax of higher melting point than paraffin, having melting points up to 185° F., usually about 160 to 165° F. It is usually yellow in color and has a different crystalline structure than paraffin which is especially noticeable in mineral oil solutions from which it crystallizes in the form of a gel from which the oil is separated with difficulty. It is a definite high melting wax to be distinguished from the ordinary plastic soft product commonly called petrolatum, which is in reality petrolatum wax blended with a considerable proportion of mineral oil. The present process is concerned with the separation of "paraffin" from petrolatum, and the separation of "petrolatum wax" from "paraffin" and petrolatum.

The method by which this is done will be fully understood from the following description:

Petrolatum is first dissolved in a light hydrocarbon solvent. The density of the solution is then decreased to a point at which a separation of phases occurs. The two phases are separated and the light hydrocarbon solvent is removed. Petrolatum oil is recovered from one phase and wax from the other.

The density of the light hydrocarbon solvent used may be decreased in several different ways. One method is to raise the temperature. A second method is to add to the light hydrocarbon solvent or to the solution another light hydrocarbon solvent having a lower molecular weight than the first light hydrocarbon solvent. A third method is to decrease the pressure maintained on the solution at the same time maintaining the temperature above the solubility point of the wax and maintaining a pressure sufficient to retain the light hydrocarbon solvent in the liquid phase at the temperature of working. A fourth method is to add to the solution a substance miscible with the light hydrocarbon solvent and capable of decreasing its density. A fifth method is to decrease the density of the mixture by adding more light hydrocarbon. After the initial solution is just in equilibrium, the addition of more light hydrocarbon will cause a separation in some cases.

Any one of the above five methods of decreasing the density of the light hydrocarbon solvent may be used to carry out the process of the present invention, but probably the most convenient method is the first one in which the density is decreased by raising temperature.

In order to illustrate more clearly the manner in which the process is carried out, liquefied propane is selected as the light hydrocarbon solvent and the temperature method of varying the density is adopted.

Petrolatum is dissolved in about 6 to 8 volumes of liquefied propane. The temperature of the solution will be about 140 or 150° F. and pressure will be maintained sufficient to retain the propane in liquid phase. When the stock is completely dissolved, the temperature of the solution is then raised to about 170 or 180° F. At this temperature the formation of two phases occurs. The bottom phase will contain the petrolatum oil and the upper phase will contain the wax. The two phases may be readily separated and thereafter the oil and wax may be recovered therefrom.

If the second method of decreasing the density is adopted, the temperature may be maintained substantially constant and quantities of liquefied or gaseous ethane may be added to the solution until a phase separation occurs.

If the third method of decreasing the density is adopted, the temperature is maintained substantially constant and the pressure maintained on the solution is gradually decreased until the formation of two phases occurs. The initial pressure is above the vapor pressure of propane at the working temperature. The second pressure is any pressure down to the vapor pressure of the liquefied hydrocarbon.

If the fourth method of decreasing the density is adopted, the temperature and pressure on the solution are maintained substantially constant and a substance miscible with propane and having a density lower than that of propane is added until the formation of two phases occurs.

It will be understood that in all cases the separation of the two phases occurs at a lower pressure or at a temperature above the temperature at which the waxy mixture dissolves in the light hydrocarbon solvent, and is brought about by a decrease in the density of the light hydrocarbon solvent.

Although the present process is applicable to many mixtures containing both oil and wax, such as crude wax, slack wax, scale wax, wax fractions obtained from distillates or residues of petroleum, wax cakes or wax mixtures obtained in any of the usual methods of dewaxing hydrocarbon oils, it is adapted especially for petrolatum which contains a considerable amount of a ceresin type of amorphous wax having a highly retentive power for the heavy oil also present.

The light hydrocarbon solvent used in the present process comprises generally hydrocarbons having between 1 and 5 carbon atoms. Mixtures of hydrocarbons containing a major proportion of hydrocarbons having between 1 and 5 carbon atoms may also be used. Suitable examples of light hydrocarbon solvents are methane, ethane, propane, butane, pentane, ethylene, propylene, butylene, amylene, isopropane, isopropylene, isobutane, isobutylene, isopentane, isoamylene and the like, although in most cases the saturated hydrocarbons are preferred. The gases evolved in a cracking or hydrogenation treatment of heavy hydrocarbon oils and the gases obtained in the stabilization or debutanization of gasoline, provide especially suitable sources of the preferred light hydrocarbon solvents. Such gases are generally rich in ethane, propane and butane.

The temperature of separation employed in the present process is in all cases above the solubility point of the wax mixture in the light hydrocarbon solvent and it may be increased up to the critical temperature of the particular light hydrocarbon solvent used which in the case of propane will be about 210° F.

The pressure maintained in the process is preferably sufficient to retain the light hydrocarbon solvent in the liquid phase at the temperature of working.

The volume of light hydrocarbon solvent used may be varied between 3 and 12 volumes per volume of wax mixture. The preferred volume of light hydrocarbon solvent will be between 4 and 8 volumes per volume of wax mixture.

The process may be carried out either in a batch, multiple state or continuous manner, as will be understood. Although the process has been described as being particularly applicable to the separation of wax from petrolatum, it should be understood that it is also applicable to other purposes. For example, it may be used to fractionate petrolatum in order to obtain waxes of different melting points, characteristics and properties. In this type of process, the solution of petrolatum in the light hydrocarbon solvent is first heated to a temperature at which only a portion of the petrolatum is thrown out in the bottom layer, the portion so thrown out is removed and thereafter the remaining solution is heated to a higher temperature at which a second portion of petrolatum is thrown out, and thereafter the solution may be heated to successively higher temperatures following each removal of the bottom layer in order to obtain as many different fractions of petrolatum as is desired.

The process may also be used to treat residual oils containing asphaltic bodies, petrolatum and paraffin. In such a process the residual oil is first dissolved in a light hydrocarbon solvent, such as liquefied propane. The solution is then chilled whereby a precipitate of asphaltic bodies, petrolatum and paraffin wax is obtained. The precipitate is separated from the solution and is then treated with an additional quantity of liquefied propane. The mixture is heated to a temperature above the solubility point of the paraffin and petrolatum at which temperature the asphalt will remain undissolved. The undissolved asphalt is removed leaving a solution of petrolatum and paraffin in propane. This solution is then heated to a temperature at which a separation of phases occurs and the petrolatum oil will be thrown out in the bottom phase while the wax will be retained in solution in the upper phase. This process may be repeated by dissolving the petrolatum fraction in a fresh quantity of propane and reprecipitating to obtain a still more complete removal of paraffin.

Other modifications and adaptations of the present process may be made as will be understood. For a better understanding of the invention, reference is now made to the accompanying drawings which are semi-diagrammatic views, in sectional elevation, of apparatus suitable for carrying out the process set forth above.

Figure 1:
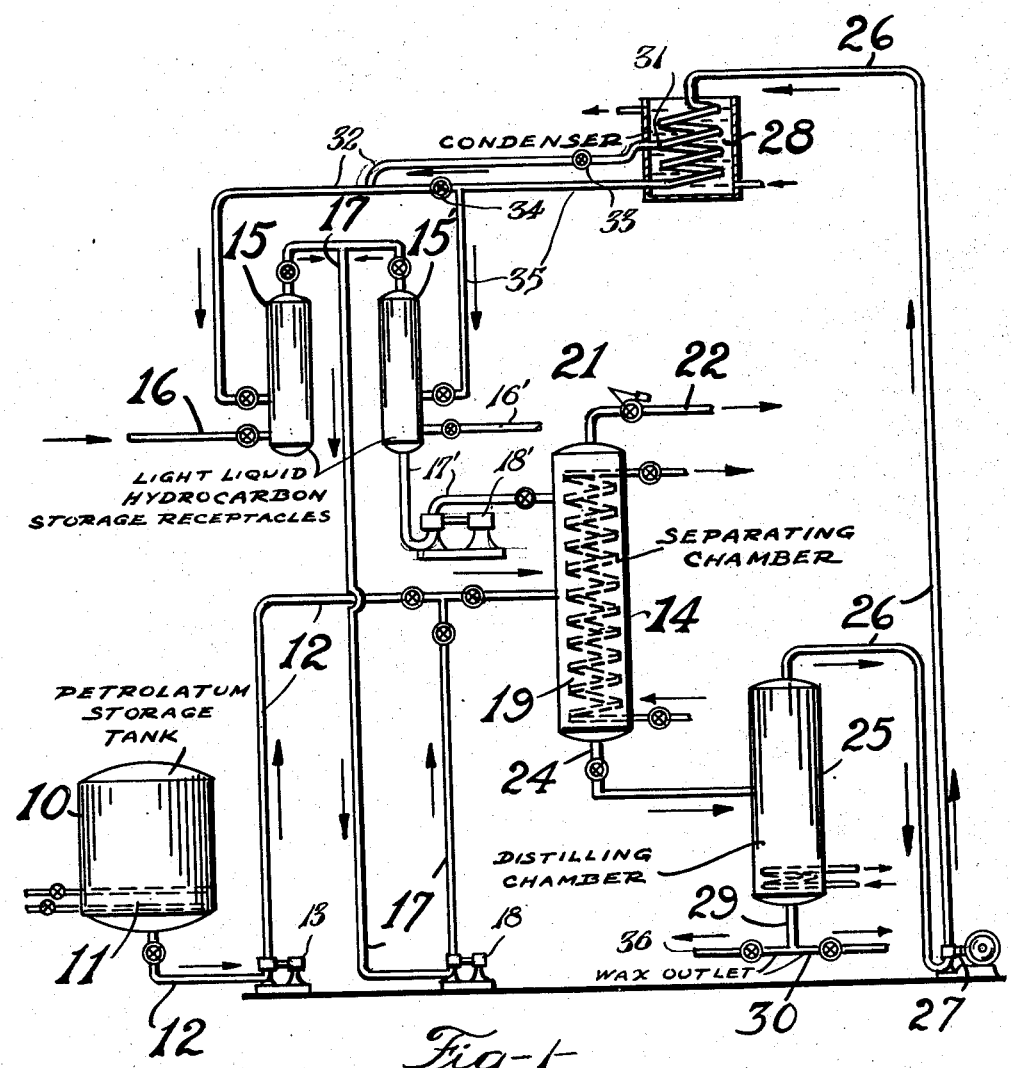
Fig. 1 illustrates an apparatus suitable for batch treatment of petrolatum.

Referring specifically to Fig. 1, the numeral 10 denotes a storage tank for a petrolatum material to be subjected to treatment according to the process set forth above. The storage tank 10 is provided with a heating coil 11 to maintain the contents of the tank in a liquid state. Material is withdrawn from the tank 10 by means of the line 12 and pump 13, being discharged thereby into a separating chamber 14. Receptacles 15 and 15', served respectively by supply lines 16 and 16', are provided for the storage of light liquid hydrocarbon. The receptacle 15 normally contains a solvent material of greater density than that contained in the receptacle 15'. The liquid contained in receptacle 15 is withdrawn therefrom by means of line 17 and pump 18 and introduced into the line 12 carrying petrolatum to the separating chamber 14. If desired, a mixing chamber for mixing the solvent and petrolatum may be introduced in the line 12 between the junction of line 17 therewith and the separating chamber 14. The ratio between the quantities of solvent and of petrolatum introduced into the chamber 14 may range from 3 to 10 volumes of solvent to 1 of petrolatum. In the separating chamber 14, the mixture of petrolatum and solvent is maintained under a pressure sufficient to maintain the light liquid hydrocarbon solvent introduced thereinto in a liquid phase.

The mixture of solvent from the receptacle 15 and petrolatum from the tank 10, after being introduced into the separating chamber 14, is reduced in density in order to affect a separation of phases as described above. This separation may be accomplished by subjecting the mixture to additional heat by means of heating coil 19 in the chamber 14, by reducing the pressure within the chamber by means of a pressure reducing valve 21 located in the line 22 leading from the top of the separating chamber 14, or it may be accomplished by introducing a lower density solvent material from the receptacle 15' by means of line 17' and pump 18'.

The mixture after being reduced in density separates into two layers within the separating chamber 14. Of these layers, the heavier or lower layer, a solution of petrolatum in solvent, is first withdrawn from the separating chamber through line 24 and passed to a distilling chamber 25 where it is subjected to distillation to remove the small percentage of solvent material contained therein. The solvent vapors thus liberated pass through line 26 through the compressor pump 27 to a condenser 28. When two solvent materials have been used, as described above, the heavier material may be drawn from the condenser at an intermediate stage, as at 31, and returned to the receptacle 15 by means of line 32, valve 33 being open. In such instance the solvent material of lower density is returned to the receptacle 15' from the lower end of the condenser 28, valve 34 being closed, by means of line 35. If desired, separation of the solvent materials may also be accomplished by use of two stages of compression in the pump 27.

When all the solvent or solvent mixture has been removed from the material withdrawn to the still 25, from the lower portion of separator 14, the residue, petrolatum, is discharged from the still by means of line 29 and one of the branched connections thereto, as line 30. The upper layer, remaining in the chamber 14, a solution of paraffin in solvent, is then withdrawn to the still 25, the distillation steps repeated to recover the solvent, and the solvent-free paraffin withdrawn from the still through line 29 and the other branched connection thereto indicated by the numeral 36.

Figure 2:
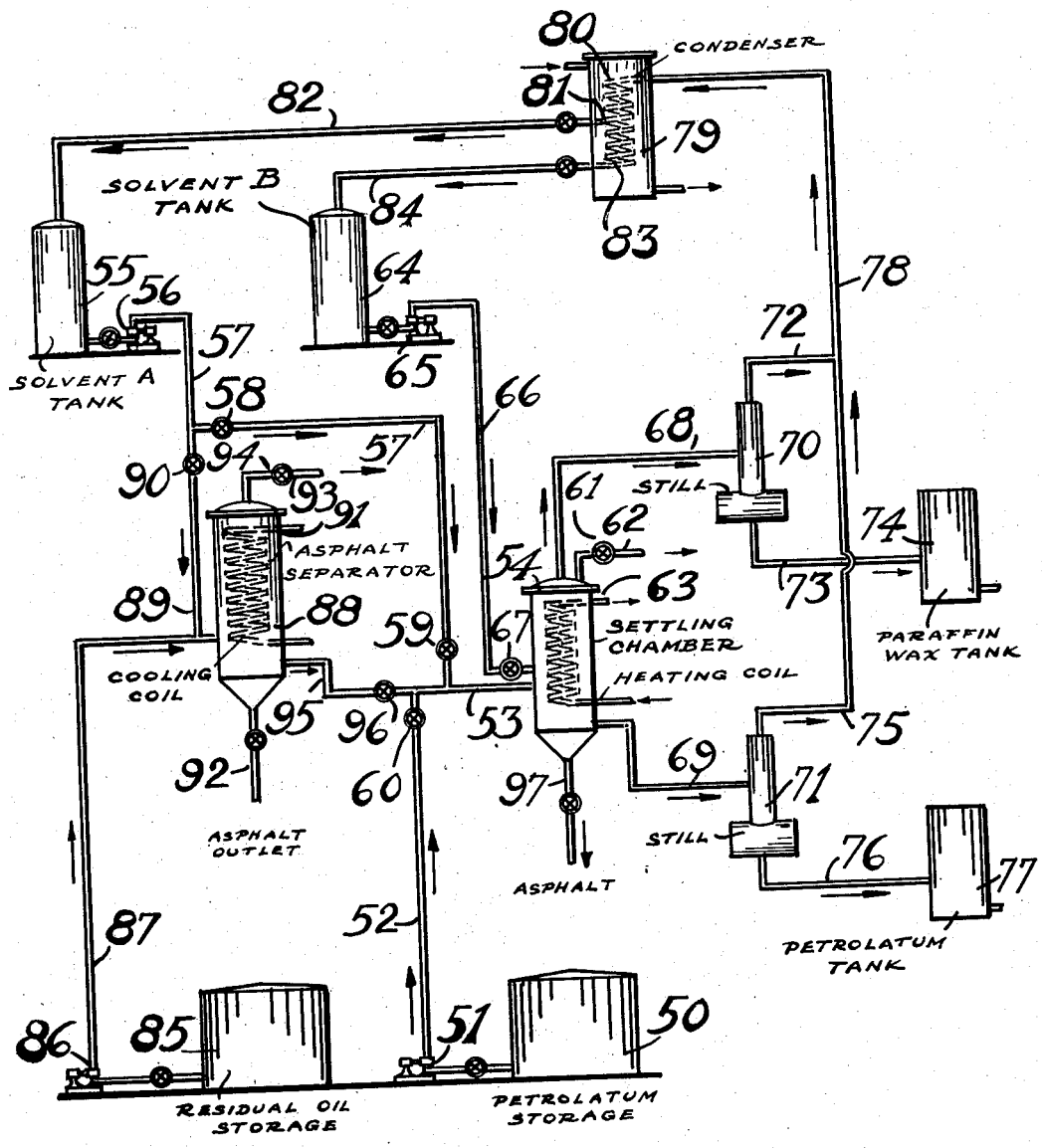
Fig. 2 illustrates a continuous treating apparatus particularly suitable for the continuous treatment of a residual oil containing asphalt and waxes.

Referring to Fig. 2 of the drawings, there is shown a complete system which is particularly adapted for use, according to the present invention, for continuous operation when using either a petrolatum-paraffin wax mixture, or a residual oil containing asphaltic bodies, petrolatum and paraffin.

In the drawing, numeral 50 designates a storage tank for the petrolatum mixture, numeral 51 a pump by means of which the mixture is discharged through lines 52 and 53 into a settling chamber 54. Numeral 55 designates a storage receptacle for a light hydrocarbon solvent material which is discharged by a pump 56 through line 57 into the petrolatum mixture in line 53. If desired, a mixing chamber may be provided in the line 53 in order to accomplish a complete mixture of the petrolatum material and solvent prior to its introduction into the chamber 54. Valves 58 and 59 are provided in the line 57, and a valve 60 in the line 52.

The mixture of petrolatum material and solvent in the chamber 54 is separated into two phases, of which the upper layer contains paraffin in solution in the solvent, and the lower layer the petrolatum and a small per cent of solvent material. The separation may be accomplished by several means, any of which operate to reduce the density of the solvent material.

(1) By reduction of pressure upon the mixture by means of the pressure release valve 61 in the line 62.

(2) By increasing the temperature within the chamber 54, by means of the heating coil 63, and (3) By the introduction of additional quantities of a solvent material of lower density than that introduced with the petrolatum material.

A storage receptacle 64 is provided for a light hydrocarbon solvent material, having a density lower than that in the receptacle 55, and the solvent is delivered therefrom, by means of pump 65, through line 66 into the chamber 54. A valve 67 is provided in the line 66 to shut off the flow of solvent therethrough.

Connected to the chamber 54 by means of lines 68 and 69 are stills 70 and 71. The upper layer of the two phase separation which takes place in chamber 54 is discharged through line 68 into still 70 where the solvent material, in which the paraffin component of the feed stock is dissolved, is distilled off through line 72, while the paraffin is discharged from the still through line 73 into a storage tank 74. The lower layer of the two phase separation, composed of petrolatum and a small per cent of solvent, is withdrawn from the chamber 54 through line 69, into still 71, where the solvent is distilled off and removed through line 75, while petrolatum is discharged from the still through line 76 into a storage tank 77.

The solvent vapors passing through lines 72 and 75 enter the line 78 and are thereby conducted into a condenser 79 through a coil 80. When a single solvent, such as derived from receptacle 55 is being used, condensate may be drawn from an intermediate point in the coil, as at 81, through line 82 and thus returned to the receptacle 55. When two solvents of different density are used, the solvent of higher density may be withdrawn at the intermediate point, while the solvent of lower density is withdrawn from the coil at the point indicated at 83 and returned to the receptacle 64 through line 84.

When, as is contemplated, it is desired to operate the system with a residual oil, containing asphaltic bodies, petrolatum, and paraffin in admixture, supplementary equipment is available, and by closing the valve 60 in line 52 and valves 58 and 59 in line 57, the system is conditioned for such operation.

Residual oil in tank 85 is discharged by means of pump 86 through line 87 into the asphalt separator 88. Solvent from the receptacle 55 passes from the line 57 into line 89, the valve 90 being opened, and is introduced into the stream of oil flowing through line 87. A cooling coil 91 is provided in the separator 88 for the purpose of inducing precipitation of the asphaltic bodies from the solvent oil mixture, and the precipitated materials are then removed from the separator through the line 92. A pressure release line 93 is connected to the separator, and contains a release valve 94. The mixture from which the asphaltic bodies have been removed is then discharged from the separator through line 95, valve 96 being opened, into the chamber 54. The operation of the apparatus, from this point, proceeds in the manner described in connection with its use in treating a petrolatum-paraffin mixture. In the present instance, however, if all the asphalt bodies are not removed in separator 88, a valved asphalt draw-off line 97 is provided on chamber 54.

Following the separation of the petrolatum oil and wax in accordance with the above outlined process, the respective materials may be subjected to additional refining treatments, such as acid and clay treatment or acid treatment in propane or other light hydrocarbon solution in order to improve the color of the waxes.

The present process of separating wax and petrolatum has many advantages over the usual method by which wax and petrolatum are recovered from crude waxy hydrocarbons. It will be observed that no chilling is necessary, the separation being effected by heating a solution of petrolatum and wax in a light hydrocarbon. The heating step is cheaper than a chilling step. Separation is made between two liquid layers instead of between a solid and a liquid as is the case in the usual process of recovering wax from petrolatum. It will also be observed that no filtration is necessary, the separation being accomplished by a simple settling operation. A settling chamber is a simpler and cheaper type of equipment than a filter. The present method also makes it possible to separate mixtures of petrolatum and paraffin wax according to molecular weight. The wax recovered is of improved color because the color bodies are concentrated in the bottom petrolatum layer.

By the present process the properties of both paraffin and petrolatum may be greatly improved. Thus paraffin may be made less tacky by the removal of small amounts of petrolatum which may contaminate it, particularly the higher melting waxes of around 135 to 150° F. This is important for certain uses such as the coating of wax papers where it is essential that the wax be free from tackiness, adhesion and "blocking." Similarly, petrolatum may be considerably improved by removing paraffin from it, particularly with regard to its crystallizing properties when used in petroleum jellies. The presence of paraffin in jellies seriously interferes with their unctuous property and transparency.

The following examples illustrate the application of the process:

*Example 1*

350 grams Elbac petrolatum which is a residual petrolatum obtained by cold settling from a mixture of Pennsylvania and Ranger-Burbank crudes are dissolved in 300 cc. butane and 2700 cc. propane.

The mixture is heated to 175° F. and a separation of phases occurs. The bottom layer is found to contain 32 grams of petrolatum having a color Robinson of 1R (dilute).

The remaining top layer is heated further to 195° F. whereupon another separation of phases occurs. The bottom layer contains 159 grams of petrolatum having a color Robinson of 2¾R (dilute).

The remaining top layer is again heated further to 240° F. and another separation of phases occurs. The bottom layer contains 106 grams of petrolatum having a color Robinson of 1¼R (straight). The top layer contains 41 grams of wax having a color Robinson of 9½R (straight).

It is observed that on a warm day oil begins to sweat out of the wax recovered from the top layer.

*Example 2*

271 grams of Elbac petrolatum are dissolved in 2300 cc. propane. The mixture is placed in a one gallon bomb and heated while shaking to about 185° F. It is allowed to stand for one hour at which time the temperature is observed to be about 162° F. A good separation of phases occurs and the bottom layer is readily drawn off. The bottom layer is found to contain 121 grams of petrolatum having a melting point of 126½° F. and a color Robinson of 2¼R (dilute). The top layer contains 150 grams of wax having a melting point of 128° F. and a color Robinson of 1⅛R (straight). The melting point of the original petrolatum is 129° F.

Although the two examples given above describe the separation of paraffin from petrolatum, it will be understood that the process is not limited to the treatment of petrolatum only. Thus, for example, the process is readily adapted to the separation of petrolatum from petroleum. A long distillate cut may be dewaxed at low temperature with propane, and the wax cake after washing free from oil at low temperature with propane, may be separated by the present process into a paraffin fraction and a petrolatum fraction each fraction possessing desirable properties not found in the mixture.

Heretofore in producing petrolatum from crude oil it has been common practice to distill the crude to a fairly low bottom in order to take off as much paraffin wax as possible, which if allowed to remain in the residuum, would seriously affect the resulting petrolatum which was obtained by diluting the residuum, acid treating and settling. The present process of separating paraffin and petrolatum makes it possible to produce a good petrolatum from a residuum which comprises a much larger proportion of the crude, for example 40% instead of 25%.

The present invention is not limited by any theories of the mechanism by which the separation is accomplished nor is it limited by any details or data which have been given merely for purposes of illustration but is limited only in and by the following claims in which it is intended to claim all novelty inherent in the invention.

We claim:

1. The method of separating petrolatum into fractions having different characteristics and properties which comprises dissolving the petrolatum in a light hydrocarbon solvent, heating the solution until the formation of two phases occurs, separating the two phases, and recovering a wax fraction from each of the obtained phases.

2. The method of separately recovering wax and petrolatum oil from a mixture containing the same which comprises dissolving the mixture in a light hydrocarbon solvent consisting essentially of hydrocarbons having between 1 and 5 carbon atoms, adding to the solution another light hydrocarbon solvent of lower molecular weight than the first light hydrocarbon solvent until the formation of two phases occurs, separating the two phases, and recovering paraffin wax from the upper phase and petrolatum from the lower phase.

3. The method of separately recovering wax from petrolatum which comprises dissolving the mixture in a light hydrocarbon solvent, decreasing the pressure maintained on the solution while maintaining substantially the same temperature until the formation of two phases occurs, separating the two phases and recovering petrolatum and paraffin wax respectively from the two phases.

4. Process according to claim 1 in which the light hydrocarbon solvent comprises a hydrocarbon having between 1 and 5 carbon atoms.

5. Process according to claim 1 in which the light hydrocarbon solvent comprises a mixture of hydrocarbon containing a substantial portion of hydrocarbons having between 1 and 5 carbon atoms.

6. The method of separating petrolatum into fractions having different characteristics and properties which comprise dissolving the petrolatum in a light hydrocarbon solvent, heating the solution to a temperature at which a portion of the petrolatum is thrown out of solution, separating the portion so thrown out, heating the remaining solution to a still higher temperature until a further portion of the petrolatum is thrown out, and removing the portion so thrown out and removing the light hydrocarbon solvent from the separately recovered portions of petrolatum.

7. The method of separately recovering wax and oil from a residual fraction of petroleum containing asphaltic bodies, petrolatum and paraffin wax which comprises dissolving the residual oil in a light hydrocarbon solvent, chilling the solution to a temperature at which wax is caused to separate, removing the material so caused to separate, redissolving this material in additional light hydrocarbon solvent, removing any material which remains undissolved, heating the solution to a temperature at which a separation of two phases occurs, separating the two phases and removing the light hydrocarbon solvent from each phase.

8. Process according to claim 7 in which undissolved asphaltic bodies are removed prior to the chilling step.

9. A method of separating wax from wax-bearing oil which comprises mixing said oil with a light hydrocarbon solvent at a temperature above the melting point of the wax, decreasing the density of the mixture while maintaining said temperature above the melting point of the wax to effect separation of the oil into fractions one of which contains a relatively larger proportion of wax than the other and thereafter removing solvent from said layers.

10. A method of separating wax from petrolatum which comprises dissolving said petrolatum in a light hydrocarbon solvent, maintaining said mixture at a temperature above the melting point of the wax and under pressure conditions which will maintain said solvent in liquid phase, decreasing the density of the mixture until the solution separates into two fractions of different specific gravities and removing solvent from the lighter of the two fractions and recovering wax therefrom.

11. In the separation of wax from wax-bearing oil wherein the oil is treated with a light liquid hydrocarbon the improvement which comprises maintaining the oil at a temperature above the melting point of the wax, adding an insufficient amount of light hydrocarbon to effect separation under obtaining conditions and thereafter decreasing the density of the oil solvent mixture until separation of the oil into two liquid phases, one of which contains a relatively high proportion of wax as compared to the other, separating the phases and removing solvent therefrom.

JAMES M. WHITELEY.
HANS G. VESTERDAL.